A. WERKMEISTER.
LIQUID MEASURING AND REGISTERING DEVICE.

No. 100,475. Patented Mar. 1, 1870.

Witnesses:

Inventor:

United States Patent Office.

A. WERRKMEISTER, OF CHARLOTTENBURG, NEAR BERLIN, PRUSSIA, ASSIGNOR TO HIMSELF AND HENRY LÖWENBERG, OF NEW YORK CITY.

Letters Patent No. 100,475, dated March 1, 1870.

IMPROVEMENT IN LIQUID-MEASURING AND REGISTERING DEVICE.

The Schedule referred to in these Letters Patent and making part of the same.

*To all whom it may concern:*

Be it known that I, A. WERRKMEISTER, of Charlottenburg, near Berlin, Kingdom of Prussia, have invented a new and improved Self-Controlling Liquid-Measure; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
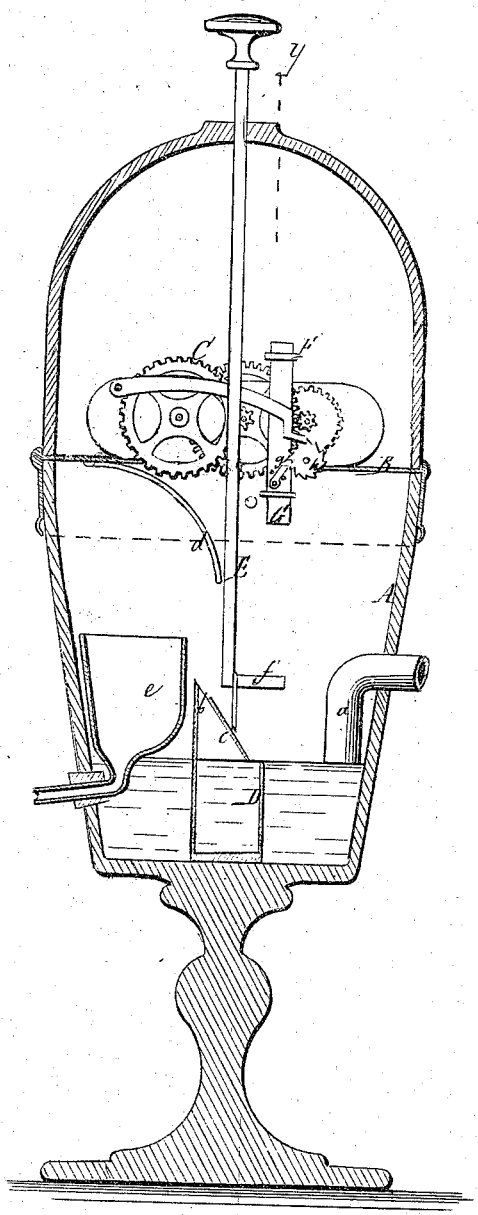
Figure 1 represents a vertical section of my invention, the line $x$–$x$, fig. 2, indicating the plane of section.
Figure 2:
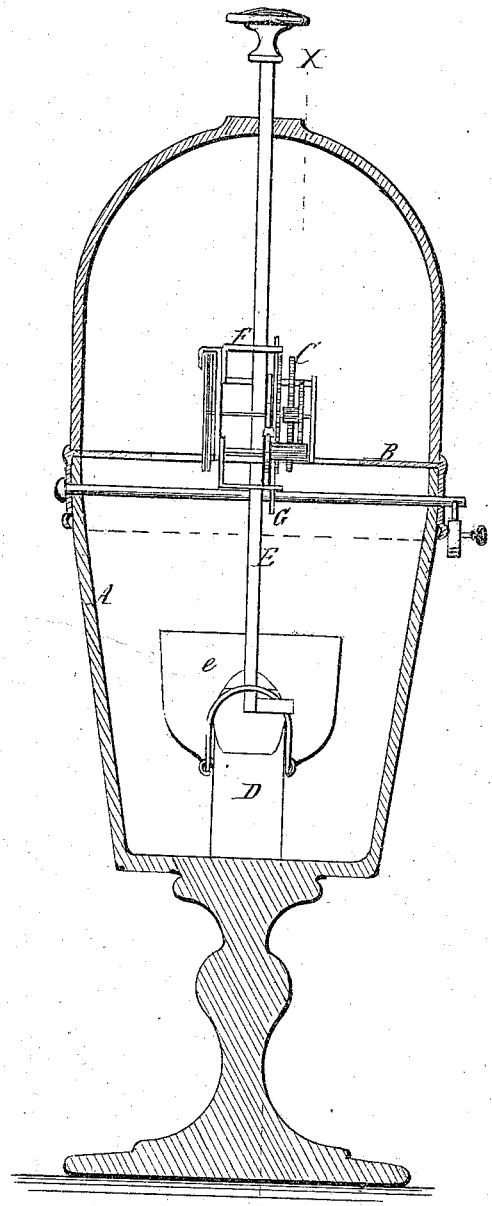
Figure 2 is a similar section of the same, taken in the plane indicated by the line $y$–$y$, fig. 1.

This invention relates to an apparatus for measuring liquids, which consists principally of a measuring-vessel inclosed in a case, which is supplied with the liquid to be measured through a siphon, so as to prevent said liquid from rising in the case beyond a certain level, and to fill the measuring-vessel always to a uniform height.

Said measuring-vessel is attached to a rod, and when the rod is drawn upward the vessel comes in contact with a stop, whereby it is tilted, and at the same time, while the vessel is being tilted, a slide is carried upward, to which is attached a pawl that acts upon the registering mechanism in such a manner that each time the measuring-vessel is emptied the registering mechanism is propelled for one tooth or figure, and the correct quantity of liquid discharged from the apparatus can thus be read off from the registering mechanism at any time.

The liquid, on being emptied from the measuring-vessel, passes off through a suitable discharge-spout, and the quantity of liquid drawn from a barrel, or other reservoir, can thus be controlled with the greatest accuracy.

In the drawing—

The letter A designates a case, made of glass or any other suitable material, and provided with an aperature in its sides, through which extends a siphon, $a$, one end of which connects with the barrel or other reservoir from which the liquid to be measured is drawn, while its other end dips down into the case to the required level to which the liquid in the case is desired to rise, since the liquid ceases to flow as soon as the mouth of the siphon $a$ is closed by the liquid rising in the bottom part of the case A.

Said case is provided with a closely-fitting cover, B, forming a platform for the support of the registering mechanism, and of the working parts of the measuring apparatus.

The measuring apparatus consists principally of a vessel, D, which is pivoted to the bottom end of a rod, E.

This rod extends in a vertical direction through the platform B, and through a suitable guide or bracket, F, which is secured to said platform, and is so arranged that it allows the measuring-vessel D to descend to the depth required for filling said vessel up to the desired level, which can be readily determined by the uniform level of liquid in the bottom part of case A.

Said measuring-vessel is constructed with a discharge-spout, $b$, and an inclined top plate, $c$, and if the rod E is drawn upward, this inclined top plate strikes a stop, $d$, secured to the under surface of the platform B, and thereby the measuring-vessel is gradually tilted on its pivot, and its contents are emptied into the discharge-spout $e$.

This spout may be constructed separate or detached from the case A, and connected to the same in any desirable manner, or it will, by preference, be made solid with the case, and said case may be so constructed that drops adhering to the end of the discharge-spout and dripping off therefrom will run back into the interior of the case, and not soil the outside thereof.

While the measuring-vessel D is being tilted, an arm, $f$, projecting from the rod E, strikes a slide, G, which moves up and down in suitable guide-openings in the platform B and bracket F, and which carries a pawl, $g$, that engages with a ratchet-wheel, $h$.

Every time the rod E is raised and the measuring-vessel emptied, the pawl $g$ propels the ratchet-wheel $h$ one tooth, and the motion of the ratchet-wheel is communicated by the usual mechanism to the index hands of the registering apparatus, so that the number of times the measuring-vessel has been emptied can be read off at all times on the dials of the registering mechanism.

The registering mechanism is covered or protected in such a manner that it cannot be tampered with.

If the measuring-vessel is so constructed that the same, when filled to the desired level, will contain a pint or any other fixed quantity, it will be easily understood that the registering mechanism will, at all times, indicate the correct quantity of liquid drawn from a barrel or other reservoir, and bar-tenders or clerks can thereby be controlled with the utmost accuracy.

What I claim as new, and desire to secure by Letters Patent, is—

1. The combination of the siphon a, with the measuring-vessel D, attached to the rising and falling rod E, substantially in the manner herein shown and described.

2. The inclined top plate c, on the measuring-vessel D, in combination with a stop, d, slide G, pawl g, and ratchet-wheel h, all constructed and operating substantially in the manner set forth.

3. The case A, inclosing the measuring-vessel D, attached to the rising and falling rod E, and provided with a discharge-spout, constructed so as to receive the liquid discharged from the measuring-vessel, and to carry the same out of said case, substantially in the manner set forth.

A. WERRKMEISTER. [L. S.[

Witnesses:
H. KREISMANN,
A. WEINSTEIN.